(12) United States Patent
Isozu et al.

(10) Patent No.: US 8,589,781 B2
(45) Date of Patent: Nov. 19, 2013

(54) INFORMATION PROCESSING DEVICE, INFORMATION PROCESSING METHOD, PROGRAM, AND INFORMATION PROCESSING SYSTEM

(75) Inventors: Masaaki Isozu, Tokyo (JP); Tsugutomo Enami, Saitama (JP); Shinichi Kawano, Tokyo (JP)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 13/203,459

(22) PCT Filed: Dec. 14, 2009

(86) PCT No.: PCT/JP2009/070818
§ 371 (c)(1),
(2), (4) Date: Aug. 25, 2011

(87) PCT Pub. No.: WO2010/100799
PCT Pub. Date: Sep. 10, 2010

(65) Prior Publication Data
US 2011/0314363 A1 Dec. 22, 2011

(30) Foreign Application Priority Data

Mar. 5, 2009 (JP) ................................ 2009-052676

(51) Int. Cl.
*G06F 17/00* (2006.01)
(52) U.S. Cl.
USPC ......................................................... 715/205
(58) Field of Classification Search
USPC ......................................................... 715/205
See application file for complete search history.

(56) References Cited

U.S. PATENT DOCUMENTS

| 6,563,514 | B1 * | 5/2003 | Samar ........................... 715/711 |
| 6,874,126 | B1 * | 3/2005 | Lapidous ...................... 715/711 |
| 6,925,496 | B1 * | 8/2005 | Ingram et al. ................. 709/224 |
| 7,975,019 | B1 * | 7/2011 | Green et al. ................... 709/217 |
| 7,975,020 | B1 * | 7/2011 | Green et al. ................... 709/217 |

(Continued)

FOREIGN PATENT DOCUMENTS

| JP | 2000-276471 | 10/2000 |
| JP | 2007-188529 | 7/2007 |

(Continued)

OTHER PUBLICATIONS

Weinreich et al., The Look of the Link—Concepts for the User Interface of Extended Hyperlinks, ACM, HT'01, Aarhus, Denmark, 2001, p. 19-28.*

(Continued)

*Primary Examiner* — Frank D Mills
(74) *Attorney, Agent, or Firm* — Sony Corporation

(57) ABSTRACT

In a case where a link to jump to a destination page is included within a source page, when movement information indicating that the link is moved to a predetermined position while being selected is input via an input section, a control section determines whether or not the link is moved to a predetermined region within a display surface based on the movement information and region information, and, when determining that the link is moved to the predetermined region within the display surface, the control section acquires from a storage section and causes a display section to execute processing of displaying on the source page, a page analysis result associated with the region information for specifying the predetermined region of a movement destination of the link.

20 Claims, 15 Drawing Sheets

(56) References Cited

U.S. PATENT DOCUMENTS

| | | | |
|---|---|---|---|
| 8,135,617 B1* | 3/2012 | Agostino et al. | 705/14.4 |
| 8,314,789 B2* | 11/2012 | Fitzmaurice et al. | 345/419 |
| 2002/0052890 A1* | 5/2002 | Ingram et al. | 707/500.1 |
| 2004/0205514 A1* | 10/2004 | Sommerer et al. | 715/501.1 |
| 2005/0216856 A1* | 9/2005 | Matti | 715/768 |
| 2005/0235203 A1* | 10/2005 | Undasan | 715/526 |
| 2006/0069603 A1* | 3/2006 | Williams et al. | 705/9 |
| 2006/0101514 A1* | 5/2006 | Milener et al. | 726/22 |
| 2007/0073833 A1* | 3/2007 | Roy et al. | 709/217 |
| 2007/0180392 A1* | 8/2007 | Russo | 715/765 |
| 2007/0198949 A1* | 8/2007 | Rummel | 715/810 |
| 2007/0204239 A1* | 8/2007 | Ray et al. | 715/856 |
| 2008/0229245 A1* | 9/2008 | Ulerich et al. | 715/834 |
| 2008/0244460 A1* | 10/2008 | Louch | 715/856 |
| 2009/0037813 A1* | 2/2009 | Newman et al. | 715/702 |
| 2009/0064047 A1* | 3/2009 | Shim et al. | 715/835 |
| 2009/0083665 A1* | 3/2009 | Anttila et al. | 715/834 |
| 2009/0172560 A1* | 7/2009 | Cole et al. | 715/744 |
| 2009/0187842 A1* | 7/2009 | Collins et al. | 715/769 |
| 2009/0187860 A1* | 7/2009 | Fleck et al. | 715/834 |
| 2009/0327963 A1* | 12/2009 | Mouilleseaux et al. | 715/834 |
| 2009/0327964 A1* | 12/2009 | Mouilleseaux et al. | 715/834 |

FOREIGN PATENT DOCUMENTS

| | | |
|---|---|---|
| JP | 2007-272859 | 10/2007 |
| JP | 2007-305165 | 11/2007 |
| JP | 2007-317220 | 12/2007 |

OTHER PUBLICATIONS

International Search Report from the Japanese Patent Office for International Application No. PCT/JP2009/070818, mailing date Mar. 16, 2010.

Supplementary European Search Report issued in corresponding European Application No. EP 09 84 1159, issued by the European Patent Office, dated May 24, 2012.

Geisler, Gary, "Enriched Links: A Framework for Improving Web Navigation Using Pop-Up Views", Journal of the American Society for Information Science, American Society for Information, pp. 1-13, Jan. 1, 2000.

* cited by examiner

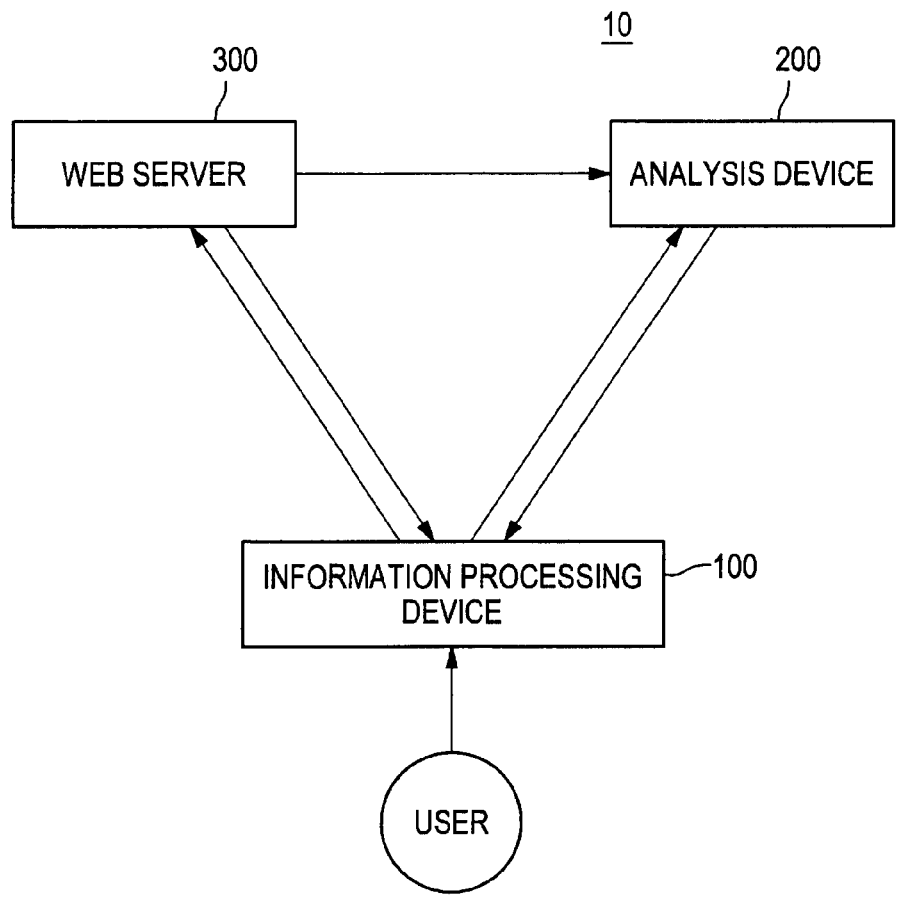
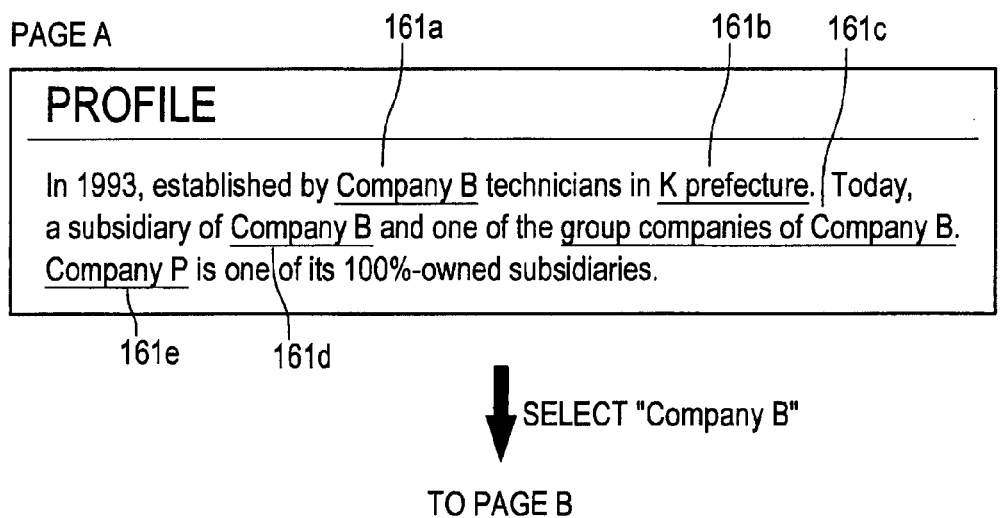

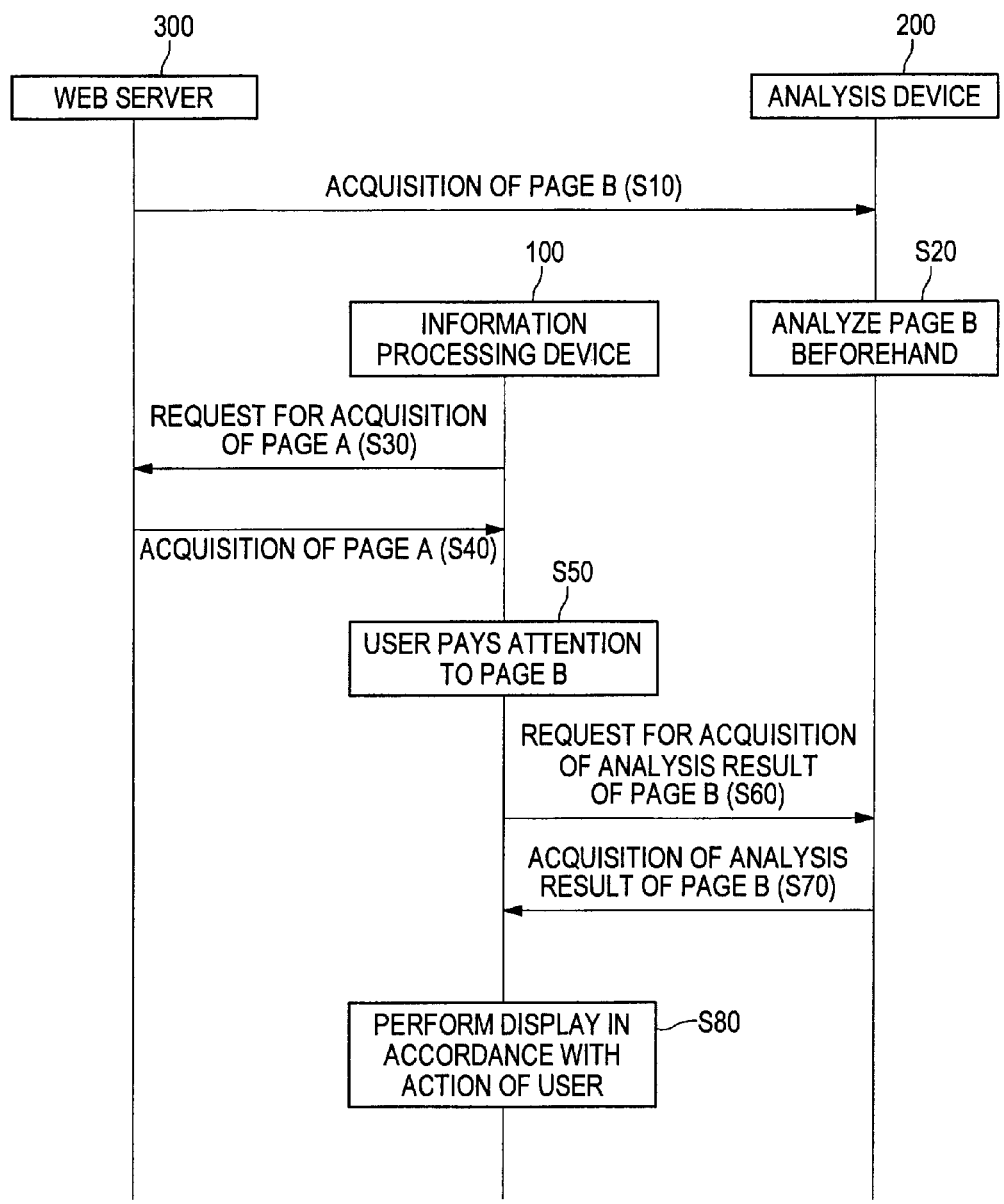

FIG.4

TABLE SHOWING ANALYSIS RESULT OF PAGE B

| GENRE | CONTENT LEVEL 1 | CONTENT LEVEL 2 | CONTENT LEVEL 3 |
|---|---|---|---|
| PROFILE | Company B is one of the major electronic manufacturers/electric-appliance manufacturers. | The largest company in the world in the field of AV equipment. Established a strong brand-name particularly in audio/video equipment. | A core company among the Company B group including companies of many fields such as electronics, entertainment, finance, and distribution. The founders are Mr. U and Mr. M. |
| HISTORY | In 2007, transferred the head office to N-ward, K-prefecture. Sold real estate held by the former head office to Company H. | In 2005, three top people including Mr. Y, a chairperson and CEO, retired, and replaced by Mr. S, a first foreign chairperson and CEO in the history of Company B. | In 2001, incorporated with Bank T and established Bank B. In 2004, acquired Company G. |
| BRAND | Besides Brand B, there is also Brand A which has a major part in low-priced products and does not use the logo of Brand B. Brand A was originally a subsidiary manufacturing low-priced audio products, and was incorporated with Company B. | In addition, the strength of Company B lies in having a "powerful sub-brand". Although it is a matter of a mere product name in other companies, it exists as an explicit brand in Company B. | The brands such as notebook PCs, playback terminals, and game devices each individually have a high brand value. |
| MAIN PRODUCTS | Personal computers, portable computers, televisions, digital cameras, video cameras | Video recorders, audio, portable audio, game devices | Sales termination |

FIG.10

| DIRECTION CONDITION | UP | DOWN | RIGHT | LEFT |
|---|---|---|---|---|
| GENRE | PROFILE | HISTORY | BRAND | MAIN PRODUCTS |

| DISTANCE CONDITION | 50 PIXELS OR LESS | 100 PIXELS OR LESS | 100 PIXELS OR MORE |
|---|---|---|---|
| CONTENT LEVEL | LEVEL 1 | LEVEL 2 | LEVEL 3 |

INFORMATION PROCESSING DEVICE, INFORMATION PROCESSING METHOD, PROGRAM, AND INFORMATION PROCESSING SYSTEM

TECHNICAL FIELD

The present invention relates to an information processing device, an information processing method, a program, and an information processing system.

BACKGROUND ART

In the past, when a user clicks a text or image link in a web browser or the like, a linked page is displayed as a new window or tab. When the user follows links from one page to another in the process of searching for a certain matter, it may become difficult to return to a previous page, and to reach the original goal. One of the causes thereof is that the linked page is opened as a window or tab that has the same size as the current page. On the other hand, although it is possible to display separately the linked information in a small window, the window needs to be moved and resized, for example, which requires additional work by the user. Consequently, it is desired that the user can grasp contents of the linked page to some extent before opening the linked page.

For example, among the functions that the web browser has, there is a function of allowing the user to see beforehand (to preview) linked information. This is the function of displaying, for example, a linked page image as a picture image and the function of displaying information that is an overview of the page, and hence, it is not enough for the user to concretely grasp the linked information.

Further, for example, there is disclosed technology of acquiring, based on a plurality of linked page addresses registered beforehand, respective linked pages, and also displaying the linked pages on respective display surfaces obtained by dividing a display surface into a plurality of parts (for example, see Patent Literatures 1 to 3).

CITATION LIST

Patent Literature

Patent Literature 1: JP 2007-305165A
Patent Literature 2: JP 2007-317220A
Patent Literature 3: JP 2007-188529A

SUMMARY OF INVENTION

Technical Problem

However, the function of allowing the user to see beforehand (to preview) linked information represents, for example, the function of displaying a linked page image as a picture image and the function of displaying information that is an overview of the page, and hence, there was a problem that it was not enough for the user to concretely grasp the linked information.

Further, with the technologies disclosed in the above-mentioned Patent Literatures 1 to 3, additional work of dividing the screen is required for the user, and hence, there was a problem that it did not necessarily improve the convenience for the user.

Accordingly, the present invention has been made in view of the above problems, and an object of the present invention is to provide a novel and new technology which makes it possible for the user to grasp linked information by an easy operation.

Solution to Problem

According to an aspect of the present invention in order to achieve the above-mentioned object, there is provided an information processing device including an input section which is capable of accepting an input of information, a display section which has a display surface and is capable of displaying information on the display surface, a communication section which is capable of communicating with another device holding page information to be a source of a page displayed on the display surface, a storage section which stores information in which region information for specifying a predetermined region within the display surface is associated with a page analysis result obtained by analyzing destination page information, and a control section which causes the communication section to execute processing of acquiring source page information from the other device and also causes the display section to execute processing of displaying the source page on the display surface based on the source page information, which, in a case where a link to jump to the destination page is included within the source page, when movement information indicating that the link is moved to a predetermined position while being selected is input via the input section, determines whether or not the link is moved to the predetermined region within the display surface based on the movement information and the region information, and which, when determining that the link is moved to the predetermined region within the display surface, acquires from the storage section and causes the display section to execute processing of displaying on the source page, the page analysis result associated with the region information for specifying the predetermined region of a movement destination of the link.

The predetermined region may be a region obtained by being divided by one or more lines each extending in a predetermined direction based on a position at which the link is present. The storage section may store the region information with inclusion of a direction condition indicating a direction based on a position at which the link is present.

The storage section may store the page analysis result by storing, according to genre, an analysis result obtained by analyzing the destination page information.

The predetermined region may be a region obtained by being divided by one or more circles each formed of a set of points positioned at a predetermined distance away from a position at which the link is present. The storage section may store the region information with inclusion of a distance condition indicating a distance based on a position at which the link is present.

The storage section may store the page analysis result by storing, according to degree of importance, an analysis result obtained by analyzing the destination page information.

The storage section may store the distance condition and the page analysis result in association with each other such that, with the increase in the distance, the degree of importance increases.

Advantageous Effects of Invention

As described above, according to the present invention, the user can grasp linked information by an easy operation.

BRIEF DESCRIPTION OF DRAWINGS

FIG. 1 is a diagram showing a schematic configuration of an information processing system according to a present embodiment.

FIG. 2 is a diagram showing an example of a page displayed by an information processing device according to the present embodiment.

FIG. 3 is a sequence diagram showing a flow of processing in the information processing system according to the present embodiment.

FIG. 4 is a diagram showing an example of a page analysis result in a table.

FIG. 10 is a diagram showing a configuration of operation/display content correspondence information (display policy) according to the present embodiment.

DESCRIPTION OF EMBODIMENTS

Figure 5:
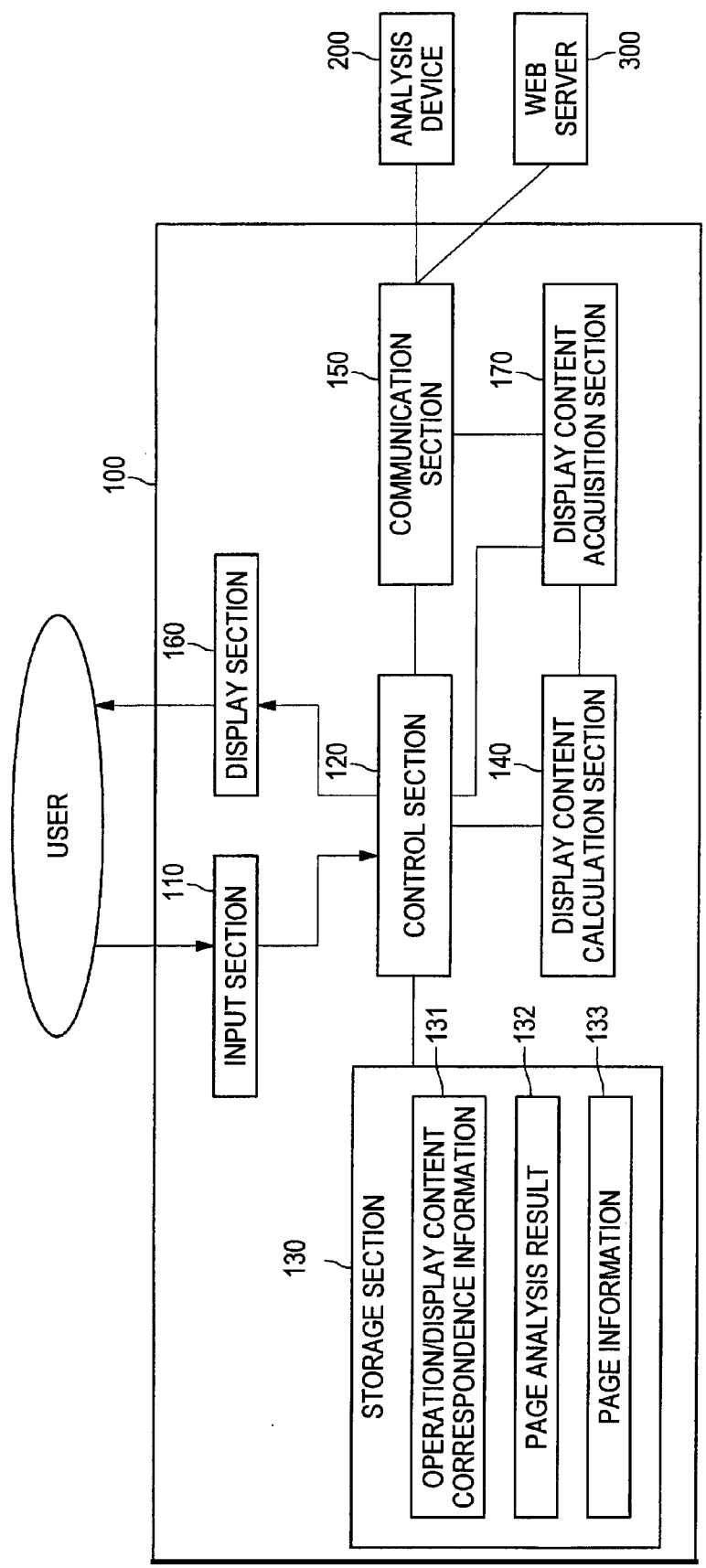
FIG. 5 is a diagram showing a functional configuration of the information processing device according to the present embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted. Note that the description will be given in the following order.

1. First Embodiment
  1-1. Schematic configuration of information processing system
  1-2. Example of page displayed by information processing device
  1-3. Flow of processing in information processing system
  1-4. Example of page analysis result
  1-5. Functional configuration of information processing device
  1-6. Functional configuration of analysis device
  1-7. Functional configuration of web server
  1-8. Hardware configuration of information processing device
  1-9. Flow of processing executed by display content calculation section
  1-10. Configuration of operation/display content correspondence information (display policy)
  1-11. Display example of guide information
  1-12. Flow of processing when user drags link
  1-13. Flow of processing for displaying information window
  1-14. Display example of information window
2. Modified example of present embodiment
3. Summary

1. First Embodiment

A first embodiment of the present invention will be described.

[1-1. Schematic Configuration of Information Processing System]

FIG. 1 is a diagram showing a schematic configuration of an information processing system according to the present embodiment. An information processing system 10 according to the present embodiment includes an information processing device 100, an analysis device 200, and, as an example of another device, a web server 300. In general, in the case where a user acquires web page information from the web server 300 via a web browser or the like executed by the information processing device 100 and views a web page, the following processing is executed. That is, the information processing device 100 accepts an operation from the user, and, in the case where the operation indicates that web page information is to be acquired, transmits a web page information acquisition request to the web server 300. When receiving the web page information acquisition request, the web server 300 sends back web page information indicated by the web page information acquisition request to the information processing device 100. When the information processing device 100 displays the web page based on the web page information acquired from the web server 300, the user can view the displayed web page.

In the present embodiment, the analysis device 200 shown in FIG. 1 structuralizes information held by the web server 300 in an appropriate form and stores the information beforehand, using technology such as web mining or data mining. For example, from a structure of a <TABLE> tag of an HTML (HyperText Markup Language) included in the web page information, a schema of a database is automatically generated and data can be stored. In the present embodiment, although the analysis device 200 and the web server 300 are provided in physically different devices, they may be provided in the physically same device.

[1-2. Example of Page Displayed by Information Processing Device]

FIG. 2 is a diagram showing an example of a page displayed by an information processing device according to the present embodiment. In FIG. 2, while viewing a page A displayed by the information processing device 100, when a user designates a link 161a to a page B, which is contained within the page A, the page B is displayed by the information processing device 100. In the same manner, when the user designates a link 161d to the page B, which is contained within the page A, the page B is displayed by the information processing device 100. When the user designates links 161b, 161c, and 161e, which are contained within the page A, the pages corresponding to the links 161b, 161c, and 161e, respectively, are displayed by the information processing device 100. In the present embodiment, there will be described a case where the user moves the link 161a while the link 161a being selected (case of performing dragging).

[1-3. Flow of Processing in Information Processing System]

FIG. 3 is a sequence diagram showing a flow of processing in the information processing system according to the present embodiment. The analysis device 200 acquires data (page information) of a target page (page B) beforehand from the web server 300 (Step S10), analyzes the data beforehand (Step S20), and stores it. When a user designates (for example, clicks, using a mouse or the like) the link 161a of the page A, the information processing device 100 transmits a request for acquisition of the page A to the web server 300 (Step S30), and acquires contents (page information) of the page A from the web server 300 (Step S40). In general, the acquisition of a page is realized with a protocol such as an HTTP (HyperText Transfer Protocol).

Next, when the user pays an attention to the page B (Step S50), the information processing device 100 transmits a request indicating that an analysis result of the page B is to be acquired to the analysis device 200 (Step S60), and acquires the analysis result of the page B from the analysis device 200 (Step S70). The information processing device 100 can grasp that the user pays an attention to the page B by detecting that the user points to the link 161a using a cursor of a mouse. Note that, here, in the case of grasping that the user pays an attention to the page B, the information processing device 100 transmits the request indicating that the analysis result of the page B is to be acquired to the analysis device 200, but the timing at which the request is transmitted is not particularly limited. The information processing device 100 displays the analysis result of the page B in accordance with an action of the user (Step S80). The processing executed from Step S50 to Step S80 is the main part in the present embodiment.

[1-4. Example of Page Analysis Result]

FIG. 4 is a diagram showing an example of a page analysis result in a table. In FIG. 4, there is shown in a table an example of a page analysis result obtained by analyzing, by the analysis device 200, the contents of the page B. For example, by using technology such as data mining, the analysis device 200 divides the target page (page B) into respective items, and make each of the items into one entry by determining a genre and a content level as an example of a degree of importance of each item. The analysis device 200 holds the content level classified into several stages with respect to a genre, based on the degree of importance and the frequency of being referred to. Here, there is shown an example in which the degree of importance is set higher in a content level 2 than in a content level 3, and is set higher in a content level 1 than in the content level 2, but the example is not limited thereto. The analysis device 200 holds the page analysis result in a storage section 220 using a URL (Uniform Resource Locator) or the like of the page B as an index.

[1-5. Functional Configuration of Information Processing Device]

FIG. 5 is a diagram showing a functional configuration of the information processing device according to the present embodiment. As shown in FIG. 5, the information processing device 100 includes at least an input section 110, a control section 120, a storage section 130, a communication section 150, and a display section 160. The information processing device 100 may further include a display content calculation section 140 and a display content acquisition section 170.

The input section 110 is configured from an input device or the like, and is capable of accepting an input of information. In the present embodiment, a case is assumed and described where the information processing device 100 is a PC (Personal Computer) and the input section 110 is a mouse. However, the input section 110 is not particularly limited as along as it is configured from an input device capable of performing operation of moving a link while selecting it. For example, the input section 110 may be a touch pad or a keyboard, and in the case where the information processing device 100 is equipped with a touch panel, the input section 110 may be the touch panel.

The storage section 130 is configured from a storage device or the like, and is capable of storing information. The storage section 130 stores information in which region information for specifying a predetermined region within a display surface of the display section 160 is associated with a page analysis result obtained by analyzing destination page information (information of the page B). The information in which the region information is associated with the page result is configured from, for example, operation/display content correspondence information 131 and a page analysis result 132. Further, the storage section 130 is capable of storing page information 133 acquired from the web server 300.

The display section 160 is configured from a display device or the like, has a display surface, and is also capable of displaying information on the display surface. The display section 160 displays the information on the display surface based on display data input from the control section 120.

The communication section 150 is configured from a communication device or the like, and is capable of communicating with the web server 300 which holds page information to be a source of a page displayed on the display surface. Further, the communication section 150 is capable of communicating with the analysis device 200.

The control section 120 is configured from a CPU (Central Processing Unit) or the like, causes the communication section 150 to execute processing of acquiring source page information (for example, information of page A) from the web server 300, and also causes the display section 160 to execute processing of displaying a source page (page A) on the display surface based on the source page information. Further, in the case where a link (for example, link 161a) to jump to a destination page is included within the source page, when movement information indicating that the link is moved to a predetermined position while being selected is input via the input section 110, the control section 120 determines whether or not the link is moved to the predetermined region within the display surface based on the movement information and the region information. When determining that the link is moved to the predetermined region within the display surface, the control section 120 acquires from the storage section 130 and causes the display section 160 to execute processing of displaying on the source page, the page analysis result associated with the region information for specifying the predetermined region of a movement destination of the link.

The display content acquisition section 170 is configured from a CPU or the like, and causes the communication section 150 to execute processing of receiving the page analysis result from the analysis device 200. Let us assume that a user is viewing the page A shown in FIG. 2 using a web browser, for example. Here, when the user tries to click the link 161a to the page B, the display content acquisition section 170 communicates with the analysis device 200 via the communication section 150. For example, a user action (user operation) of "trying to perform clicking" can be grasped, by detecting an event such as a mouse over by the control section 120. With the communication with the analysis device 200 via the communication section 150, the display content acquisition section 170 acquires an analysis result of the page B.

The display content calculation section 140 is configured from a CPU or the like, and causes the storage section 130 to store the page analysis result received by the communication section 150 in association with the region information for specifying a predetermined region within the display surface of the display section 160. As for a technique of associating the page analysis result with the region information, it is not particularly limited. For example, there may be imparted a degree of priority to each page analysis result and each region information, and the ones with high degree of priority may be associated with each other in sequence.

[1-6. Functional Configuration of Analysis Device]

Figure 6:
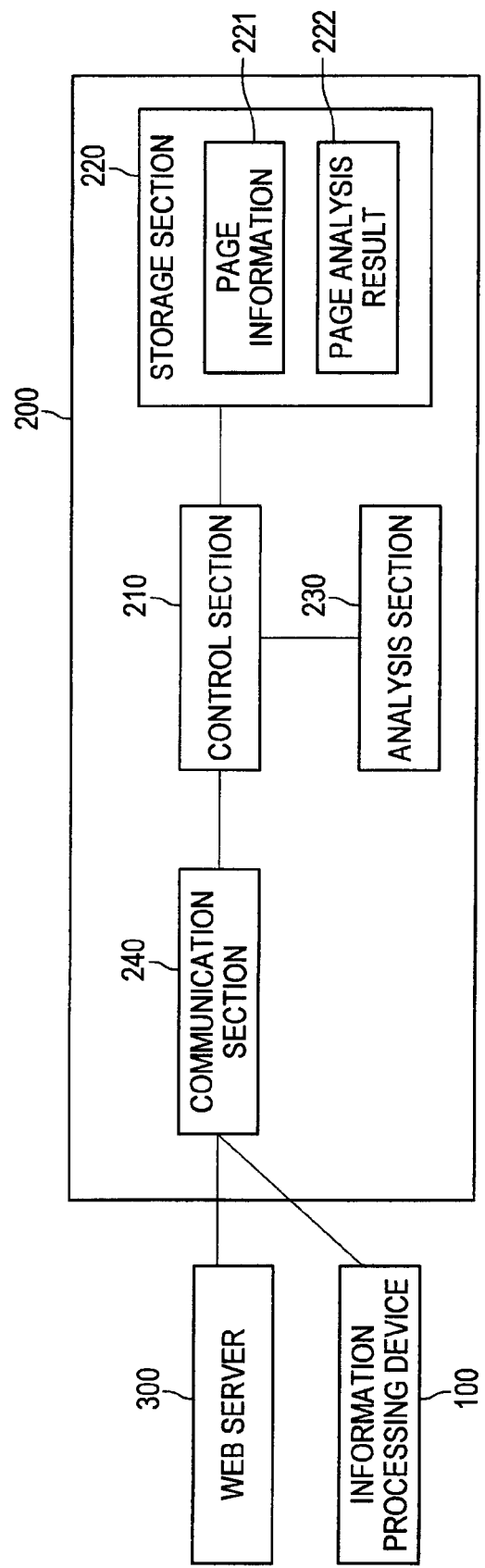
FIG. 6 is a diagram showing a functional configuration of an analysis device according to the present embodiment.

FIG. 6 is a diagram showing a functional configuration of an analysis device according to the present embodiment. As shown in FIG. 6, the analysis device 200 includes a control section 210, a storage section 220, an analysis section 230, and a communication section 240.

The storage section 220 is configured from a storage device or the like, and is capable of storing information. The storage section 220 is capable of storing page information 221 acquired from the web server 300. Further, the storage section 220 can store a page analysis result 222 obtained by analyzing the page information 221.

The communication section 240 is configured from a communication device or the like, and is capable of communicating with the web server 300 which holds page information. Further, the communication section 240 is capable of communicating with the information processing device 100.

The analysis section 230 is configured from a CPU or the like, and is capable of analyzing the page information 221 and acquiring the page analysis result 222.

The control section 210 is configured from a CPU or the like, and causes the communication section 240 to execute processing of acquiring destination page information (for example, information of page B) at a predetermined timing from the web server 300. Further, when the communication section 240 determines that a page analysis result acquisition request is received from the information processing device 100, the control section 210 causes the analysis section 230 to execute processing of analyzing page information (for example, information of page B) indicated by the page analysis result acquisition request received by the communication section 240 and acquiring a page analysis result. The control section 210 causes the communication section 240 to execute processing of transmitting the page analysis result acquired by the analysis section 230 to the information processing device 100.

[1-7. Functional Configuration of Web Server]

Figure 7:
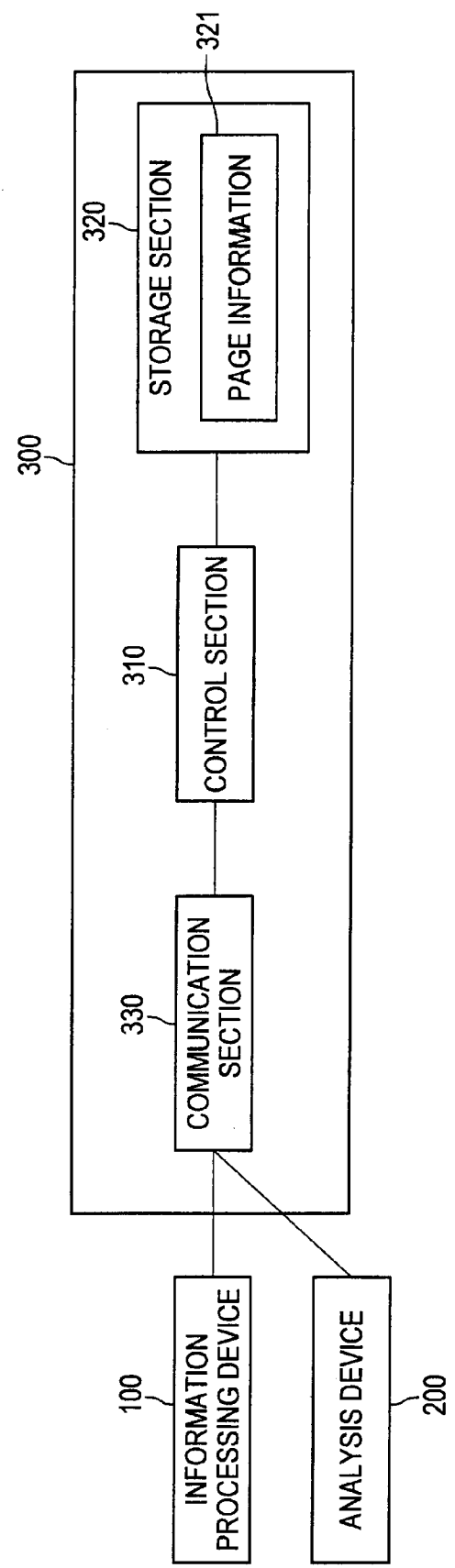
FIG. 7 is a diagram showing a functional configuration of a web server according to the present embodiment.

FIG. 7 is a diagram showing a functional configuration of a web server according to the present embodiment. As shown in FIG. 7, the web server 300 includes a control section 310, a storage section 320, and a communication section 330.

The storage section 320 is configured from a storage device or the like, and is capable of storing information. The storage section 220 is capable of storing page information 321 (information of page A, information of page B, or the like).

The communication section 330 is configured from a communication device or the like, and is capable of communicating with the analysis device 200. Further, the communication section 330 is capable of communicating with the information processing device 100.

The control section 340 is configured from a CPU or the like, and, when the communication section 330 determines that a page information acquisition request indicating that page information 321 (for example, information of page A) is to be acquired is received from the information processing device 100, causes the communication section 330 to execute processing of sending back the page information 321 (for example, information of page A) to the information processing device 100. Further, when the communication section 330 determines that a page information acquisition request indicating that page information 321 (for example, information of page B) is to be acquired is received from the analysis device 200, the communication section 330 is caused to execute processing of sending back the page information 321 (for example, information of page B) to the analysis device 200.

[1-8. Hardware Configuration of Information Processing Device]

Figure 8:
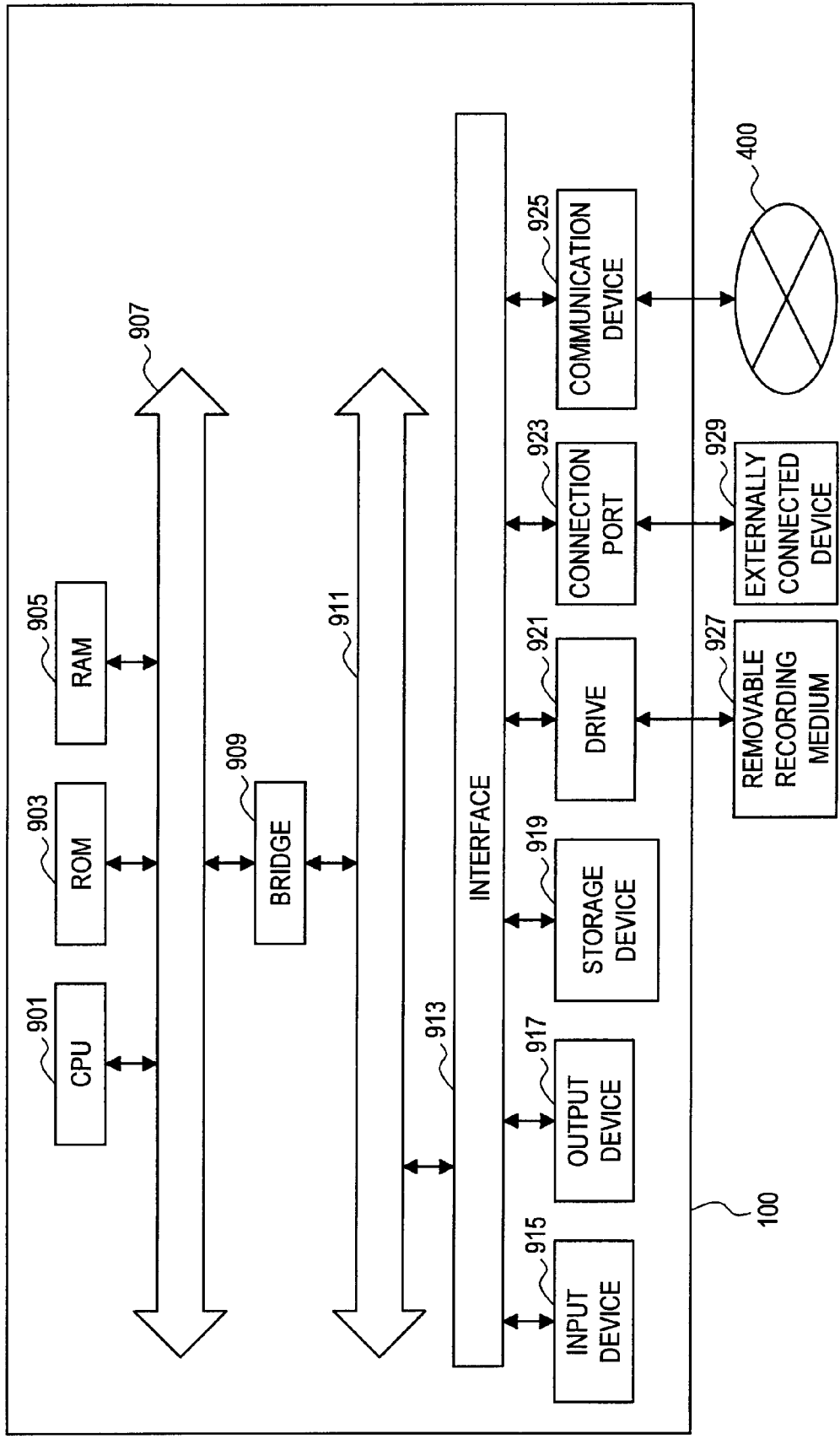
FIG. 8 is a diagram showing a hardware configuration of the information processing device according to the present embodiment.

FIG. 8 is a diagram showing a hardware configuration of the information processing device according to the present embodiment. The information processing device 100 mainly includes a CPU 901, a ROM 903, a RAM 905, a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls the overall operation or a part of the operation of the information processing device 100 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is operation means operated by a user, such as a mouse, a keyboard, a touch panel, buttons, a switch and a lever. Also, the input device 915 may be a remote control means (so-called remote control) using, for example, infrared light or other radio waves, or may be an externally connected device 929 such as a mobile phone or a PDA compatible with the operation of the information processing device 100. In addition, the input device 915 generates an input signal based on, for example, information which is input by a user with the above operation means, and is configured from an input control circuit for outputting the input signal to the CPU 901. The user of the information processing device 100 can input various data to the information processing device 100 and can instruct the information processing device 100 to perform processing by operating this input device 915.

The output device 917 is configured from a device capable of visually or audibly notifying a user of acquired information, and examples of such device include display devices such as a CRT display device, a liquid crystal display device, a plasma display device, an EL display device and a lamp, audio output devices such as a speaker and a headphone, a printer, a mobile phone, and a facsimile machine. For example, the output device 917 outputs a result obtained by various processes performed by the information processing device 100. More specifically, the display device displays, in the form of texts or images, a result obtained by various processes performed by the information processing device 100. On the other hand, the audio output device converts an audio signal such as reproduced audio data and acoustic data into an analog signal, and outputs the analog signal.

The storage device 919 is a device for storing data configured as an example of a storage section of the information processing device 100 and is used to store data, and is configured from, for example, a magnetic storage device such as an HDD (Hard Disk Drive), a semiconductor storage device, an optical storage device, or a magneto-optical storage device. This storage device 919 stores programs to be executed by the CPU 901, various data, and acoustic signal data or picture image signal data obtained from the outside.

The drive 921 is a reader/writer for recording medium, and is embedded in the information processing device 100 or attached externally thereto. The drive 921 reads information recorded in the attached removable recording medium 927 such as a magnetic disk, an optical disk, a magneto-optical disk, or a semiconductor memory, and outputs the read information to the RAM 905. Further, the drive 921 can write in the attached removable recording medium 927 such as a magnetic disk, an optical disk, a magneto-optical disk, or a semiconductor memory. The removable recording medium 927 may be, for example, a DVD medium, an HD-DVD medium, a Blu-ray medium, a CompactFlash (CF, registered trademark), a memory stick, or an SD memory card (Secure Digital Memory Card). Alternatively, the removable recording medium 927 may be, for example, an IC card (Integrated Circuit Card) equipped with a non-contact IC chip or an electronic appliance.

The connection port 923 is a port for allowing devices to directly connect to the information processing device 100, and examples thereof include a USB (Universal Serial Bus) port, an IEEE1394 port such as i.Link, an SCSI (Small Computer System Interface) port, an RS-232C port, an optical audio terminal, and an HDMI (High-Definition Multimedia Interface) port. The connection of the externally connected device 929 to this connection port 923 enables the information processing device 100 to directly obtain the acoustic signal data or the picture image signal data from the externally connected device 929 and to provide the acoustic signal data or the picture image signal data to the externally connected device 929.

The communication device 925 is a communication interface configured from, for example, a communication device for establishing a connection to a network 400. The communication device 925 is, for example, a wired or wireless LAN (Local Area Network), Bluetooth (registered trademark), a communication card for WUSB (Wireless USB), a router for optical communication, a router for ADSL (Asymmetric Digital Subscriber Line), or a modem for various communications. This communication device 925 can transmit and receive the acoustic signal data and the like on the Internet and with other communication devices, for example. The network 400 connected to the communication device 925 is configured from a network and the like, which is connected via wire or wirelessly, and may be, for example, the Internet, a home LAN, infrared communication, radio wave communication, and satellite communication.

Heretofore, an example of the hardware configuration capable of realizing the functions of the information processing device 100 according to each embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Note that, although it is assumed that the analysis device 200 and the web server 300 may not have the input device 915, the output device 917, and the drive 921, which are included in the information processing device 100, as for the rest, the analysis device 200 and the web server 300 each have the same hardware configuration as the hardware configuration of the information processing device 100.

[1-9. Flow of Processing Executed by Display Content Calculation Section]

Figure 9:
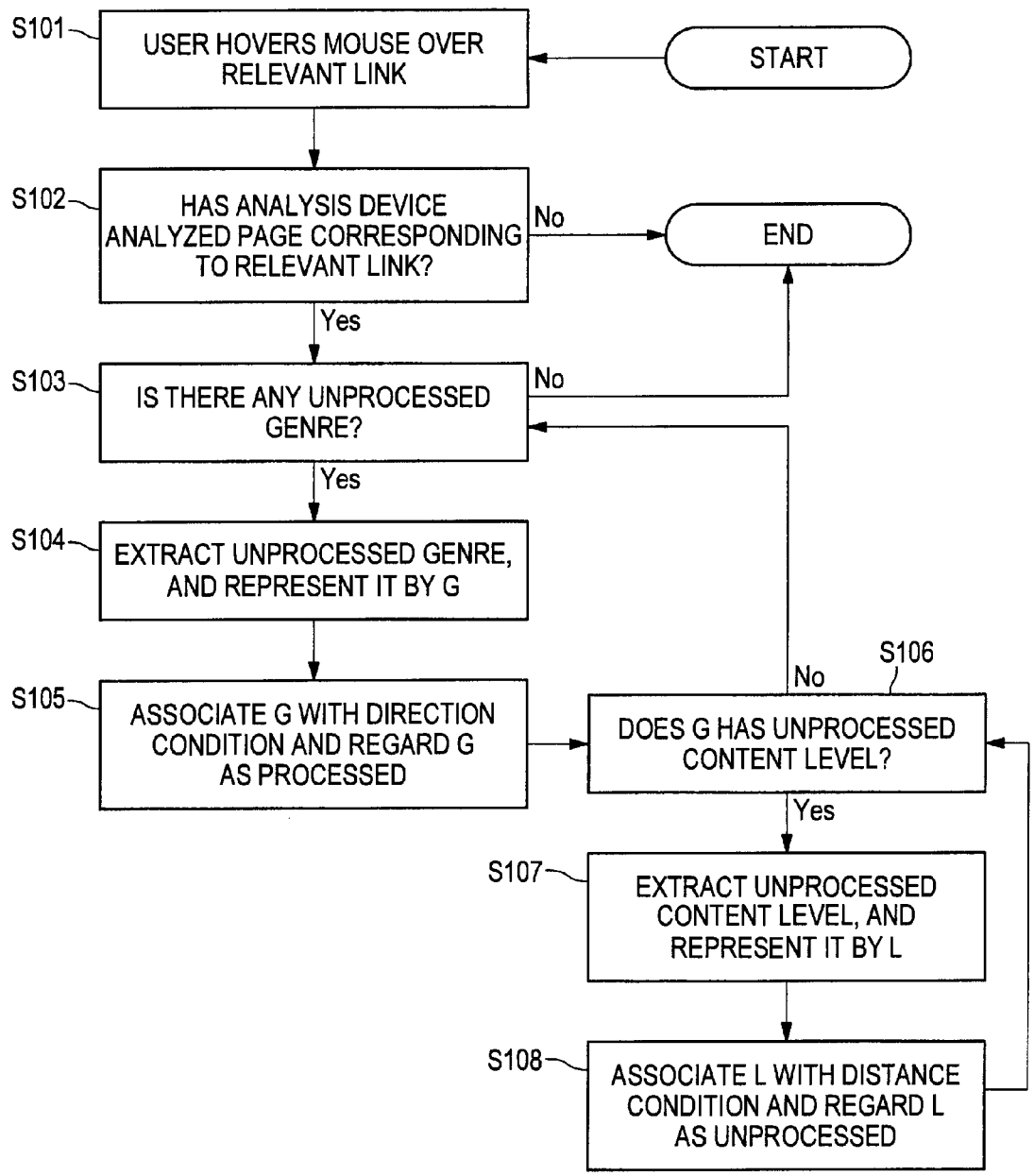
FIG. 9 is a flowchart showing a flow of processing executed by a display content calculation section according to the present embodiment.

FIG. 9 is a flowchart showing a flow of processing executed by a display content calculation section according to the present embodiment. As shown in FIG. 9, when a user tries to click the link 161*a*, the display content calculation section 140 makes an inquiry to the analysis device 200 and acquires a page analysis result (see FIG. 4). To the page analysis result, a genre and a content level are imparted, for example. At first, since all genres shown in FIG. 4 are unprocessed, the display content calculation section 140 extracts in sequence the genres each imparted to the page analysis result, and associates the genre with a direction condition. For the association of the genre with the direction condition, there is assumed the association of a genre (history) with a direction condition (up). Next, the display content calculation section 140 associates a content level with a distance condition, the content level being imparted to the page analysis result to which the genre being associated with the direction condition is imparted. Here, the display content calculation section 140 associates a content level (1) with a distance condition (50 pixels or less), and associates a content level (2) with a distance condition (100 pixels or more). By repeating this, the display content calculation section 140 can generate the operation/display content correspondence information 131 (display policy) from the page information analysis result. FIG. 10 shows the display policy generated by the display content calculation section 140 from the analysis result of the page B shown in FIG. 4.

[1-10. Configuration of Operation/Display Content Correspondence Information (Display Policy)]

FIG. 10 is a diagram showing a configuration of operation/display content correspondence information (display policy) according to the present embodiment. In FIG. 10, although a common content level is associated with each distance condition, different content level may be set to each genre.

[1-11. Display Example of Guide Information]

Figure 11:
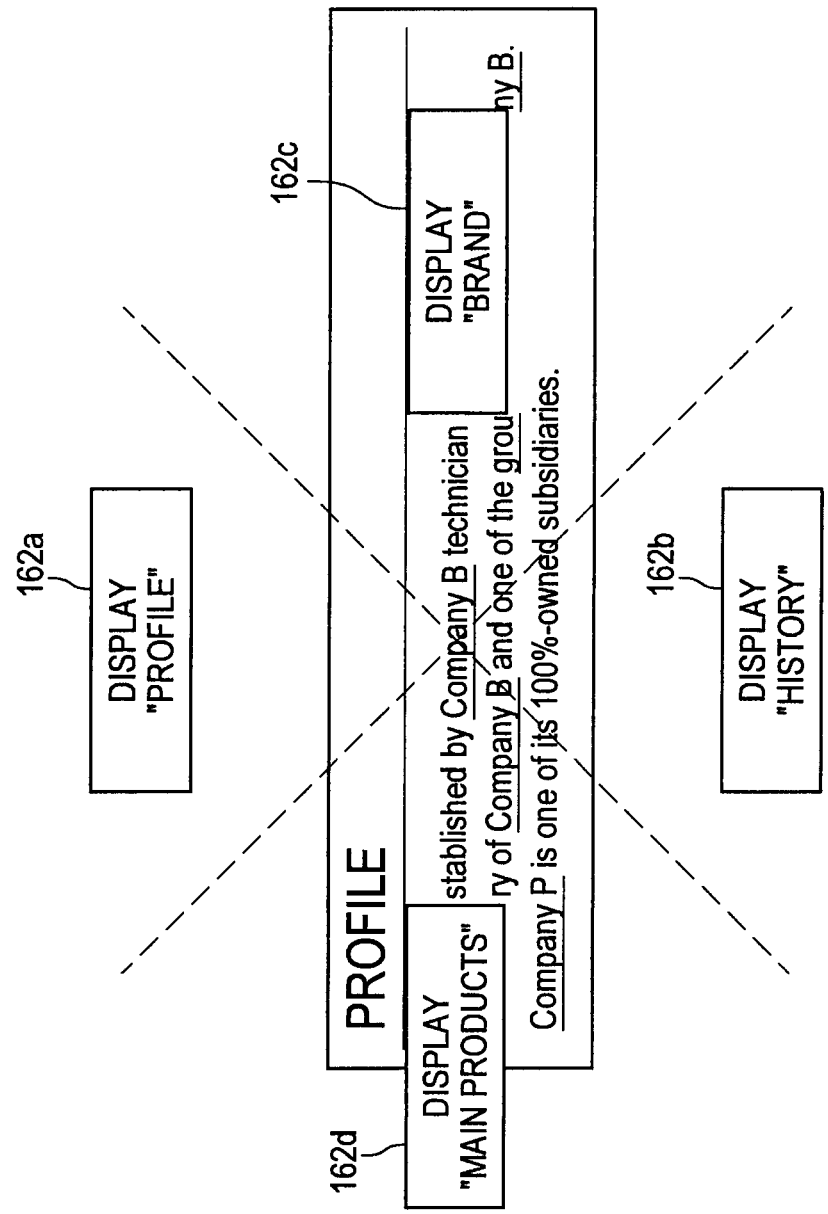
FIG. 11 is a diagram showing a display example of guide information.

FIG. 11 is a diagram showing a display example of guide information. As shown in FIG. 11, a predetermined region may be a region obtained by being divided by one or more lines each extending in a predetermined direction based on a position at which the link 161*a* is present. In this case, the storage section 130 may store the region information with the inclusion of the direction condition indicating a direction based on the position at which the link 161*a* is present. Further, the storage section 130 may store the page analysis result by storing, according to genre, an analysis result obtained by analyzing destination page information. When detecting that the user hovers a mouse over the link 161*a*, the control section 120 may display pieces of guide information 162*a* to 162*d* in accordance with the operation/display content correspondence information (display policy) 131 shown in FIG. 10. When the user drags the link 161*a* in directions indicated by the pieces of guide information 162*a* to 162*d*, respective page analysis results of corresponding genres are displayed. The direction of the dragging can be determined by calculating the difference between the coordinates at the start of the dragging and the coordinates at the end of the dragging.

The predetermined region may be a region obtained by being divided by one or more circles each formed of a set of points positioned at a predetermined distance away from a position at which the link 161*a* is present. In this case, the storage section 130 may store the region information with the inclusion of the distance condition indicating a distance based on the position at which the link 161*a* is present. The control section 120 can also calculate a drag distance.

The storage section 130 may store the page analysis result by storing, according to degree of importance (or by the number of times being referred to), an analysis result obtained by analyzing destination page information. Further, the storage section 130 may store the distance condition and the page analysis result in association with each other such that, with the increase in the distance, the degree of importance increases.

[1-12. Flow of Processing when User Drags Link]

Figure 12:
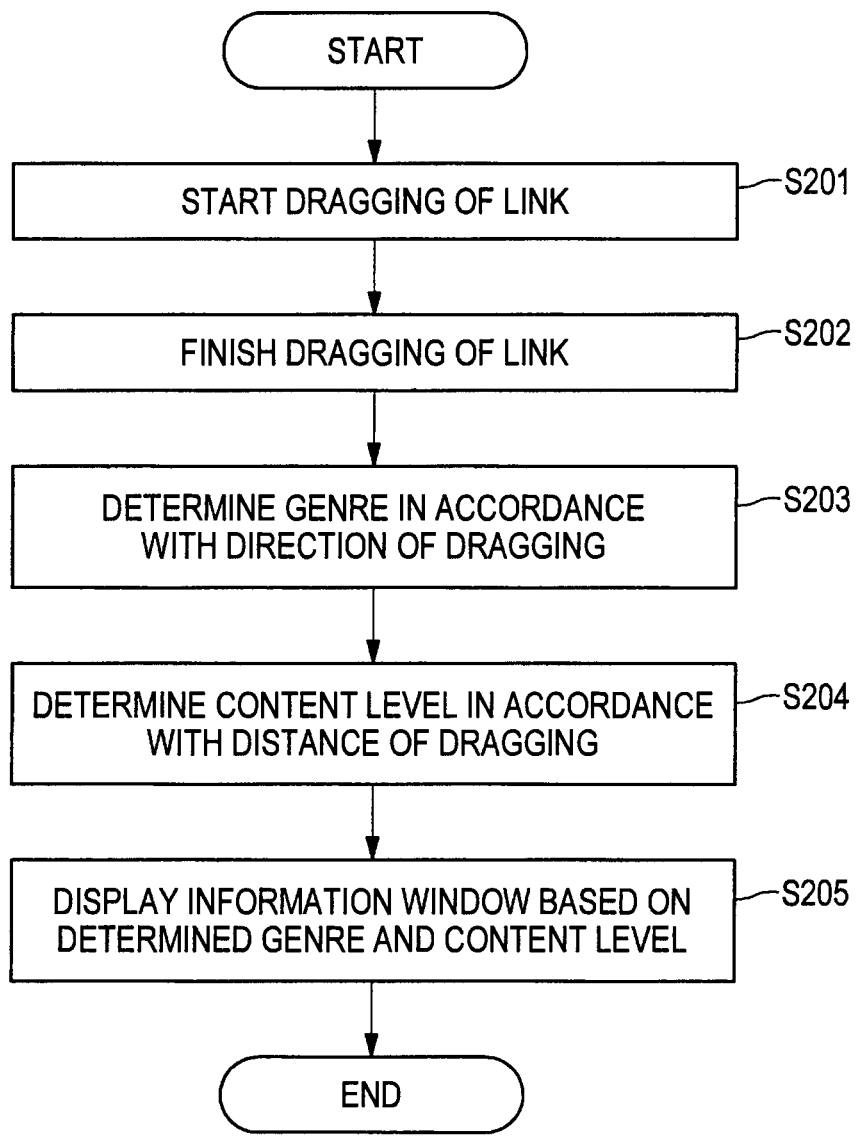
FIG. 12 is a flowchart showing a flow of processing when a user drags a link.

FIG. 12 is a flowchart showing a flow of processing when a user drags a link. As shown in FIG. 12, when the dragging of the link 161a is finished, the information processing device 100 can acquire a drag direction and a drag distance. Accordingly, for example, when the user drags the link 161a 80 pixels to the right, the information processing device 100 displays an information window 163b up to the content level 2, whose genre is "brand".

[1-13. Flow of Processing for Displaying Information Window]

Figure 13:
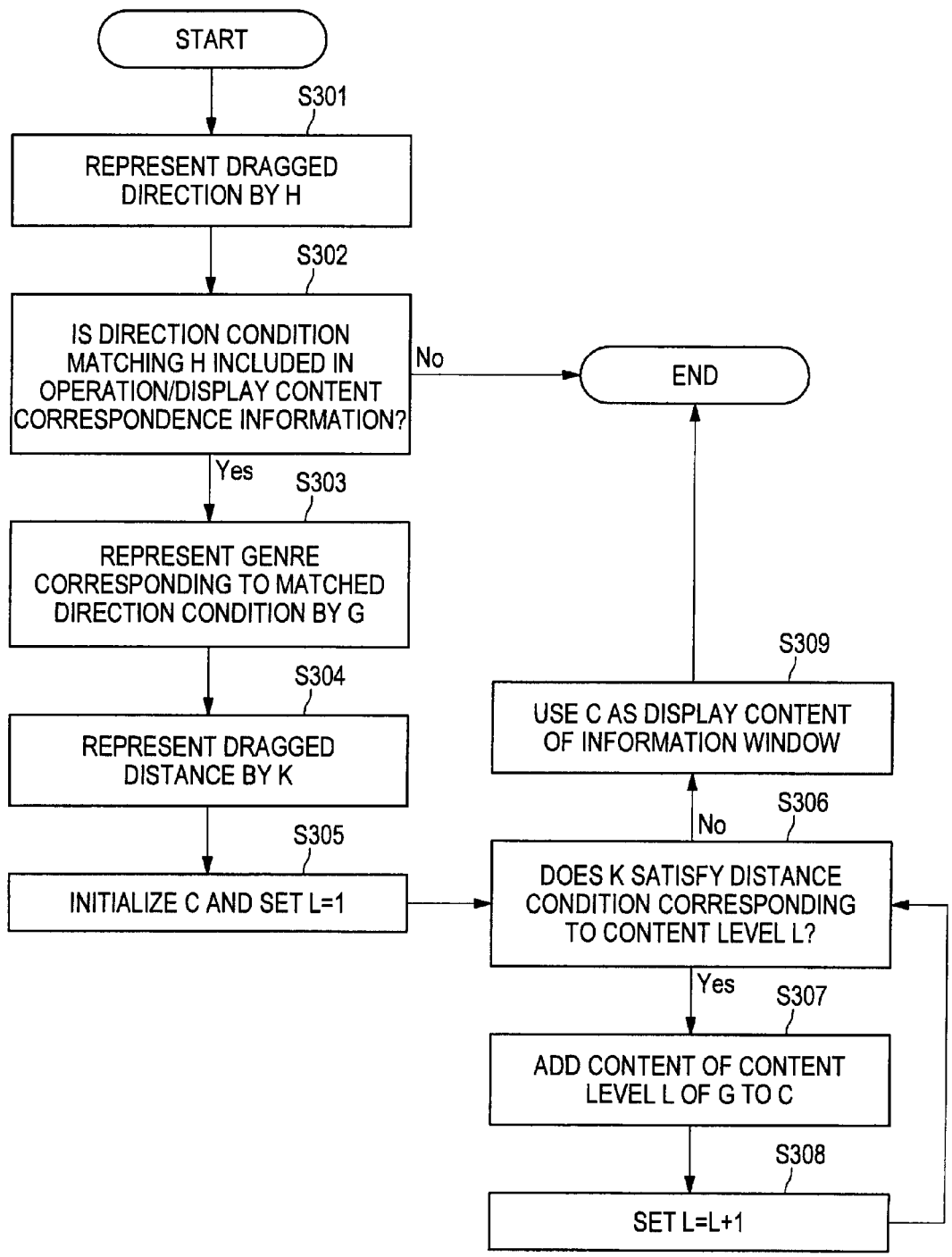
FIG. 13 is a flowchart showing a flow of processing for displaying an information window based on a drag direction and a drag distance of the link.

FIG. 13 is a flowchart showing a flow of processing for displaying an information window based on a drag direction and a drag distance of the link. The information processing device 100 displays the information window 163b based on the drag direction and the drag distance of the link 161a.

[1-14. Display Example of Information Window]

Figure 14:
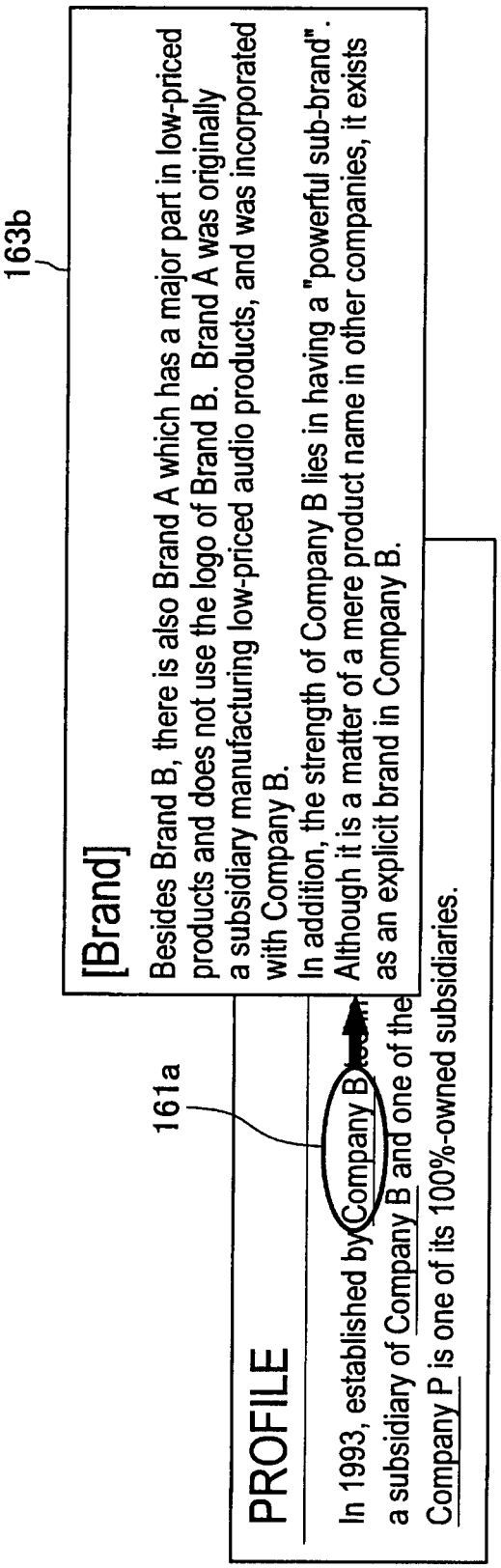
FIG. 14 is a diagram showing a display example of an information window.

FIG. 14 is a diagram showing a display example of an information window. When the processing is executed along the flow shown in the flowchart shown in FIG. 13, in the case where the content level imparted to the page analysis result is "2", the information processing device 100 displays the page analysis result to which the content level "1" is imparted and the page analysis result to which the content level "2" is imparted in combination, as the information window 163b. However, the information processing device 100 may also display only the page analysis result to which the content level "2" is imparted. In this regard, changes can be made as to which page analysis result corresponding to which content level is to be displayed, by flexibly setting the operation/display content correspondence information 131 (display policy). When accepting an input (input of click operation using a mouse or the like) indicating that the information window 163b is to be designated from the user, the information processing device 100 may close the information window 163b. In this way, it is desirable to hide the information window 163b by an easy operation performed by the user.

2. Modified Example of Present Embodiment

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in FIG. 1, the web server 300 and the analysis device 200 are each provided in physically different casing, but there is assumed a case where a first page (for example, page A) has already been analyzed by the analysis device 200. This represents the case of storing arbitrary data in a database of a unique format and providing the data by converting it into an HTML format as appropriate in response to a request, for example. In this case, the analysis device 200 also plays a role of the web server 300. Further, there may be considered a case where the analysis device 200 is eliminated and the analysis processing is performed at the web browser side of the information processing device 100.

Further, FIG. 10 shows an example in which the genre is changed in accordance with the drag direction and the content level is changed in accordance with the drag distance. However, in an opposite manner, there may be considered a modified example in which the content level is changed in accordance with the drag direction and the genre is changed in accordance with the drag distance.

Figure 15:
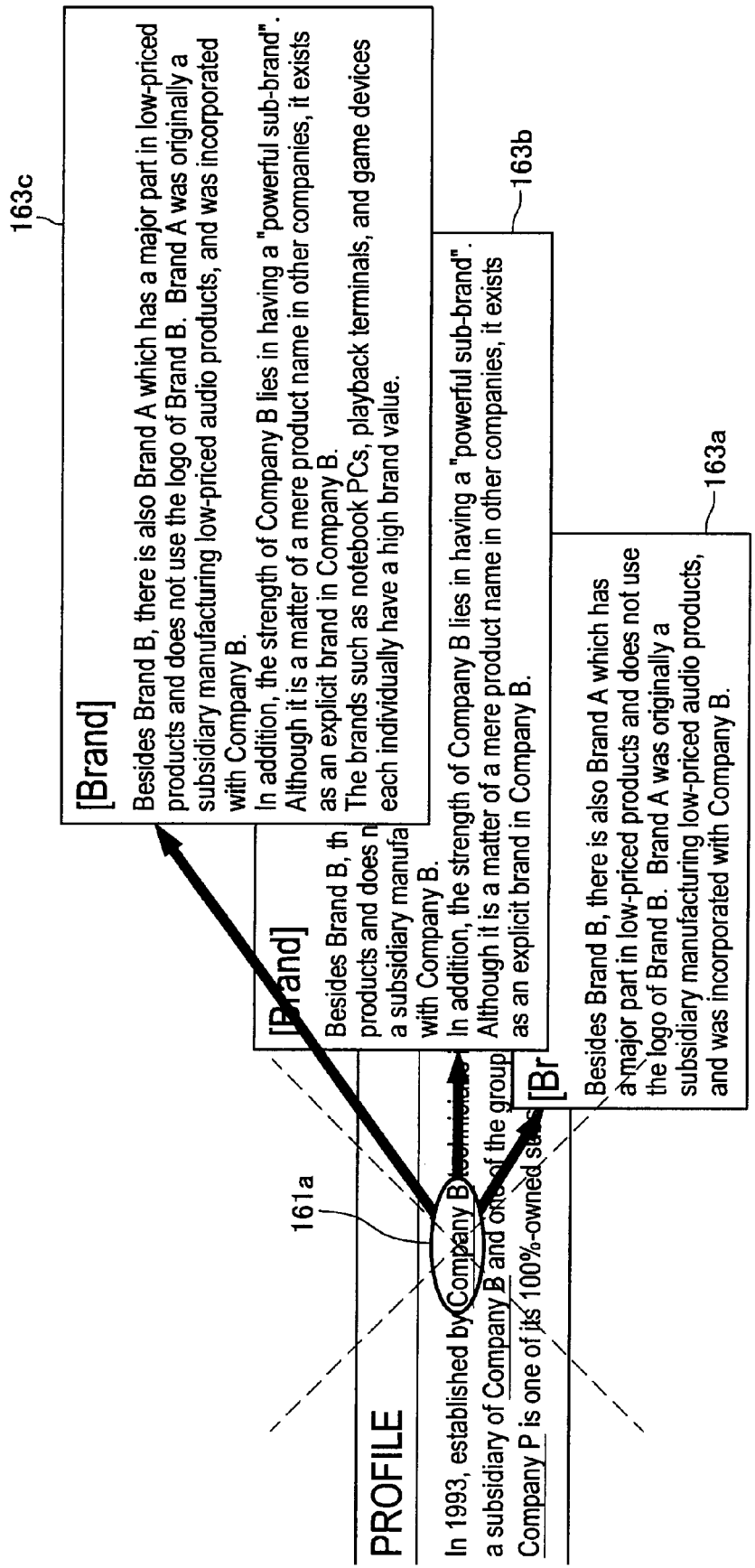
FIG. 15 is a diagram showing a state where display contents change depending on the drag distance.

FIG. 15 is a diagram showing a state where display contents change depending on the drag distance. In the example shown in FIG. 15, with the increase in the drag distance, the display contents of a genre become more expanded. In addition thereto, there may be considered a modified example in which, with the increase in the distance, pieces of information on larger number of genres are displayed.

3. Summary

According to the present embodiment, linked information can be displayed by an easy operation. In general, it was necessary to execute steps of opening a linked page as a new window, resizing the window, and moving the window near a link, thereby displaying the window. According to the present embodiment, the information window can be displayed only by dragging a link, and hence, the convenience is improved. In particular, when the guide information is displayed, which is for grasping what sort of information-display window is displayed in accordance with the direction and the distance, a comfortable operation can be performed.

Figure 16:
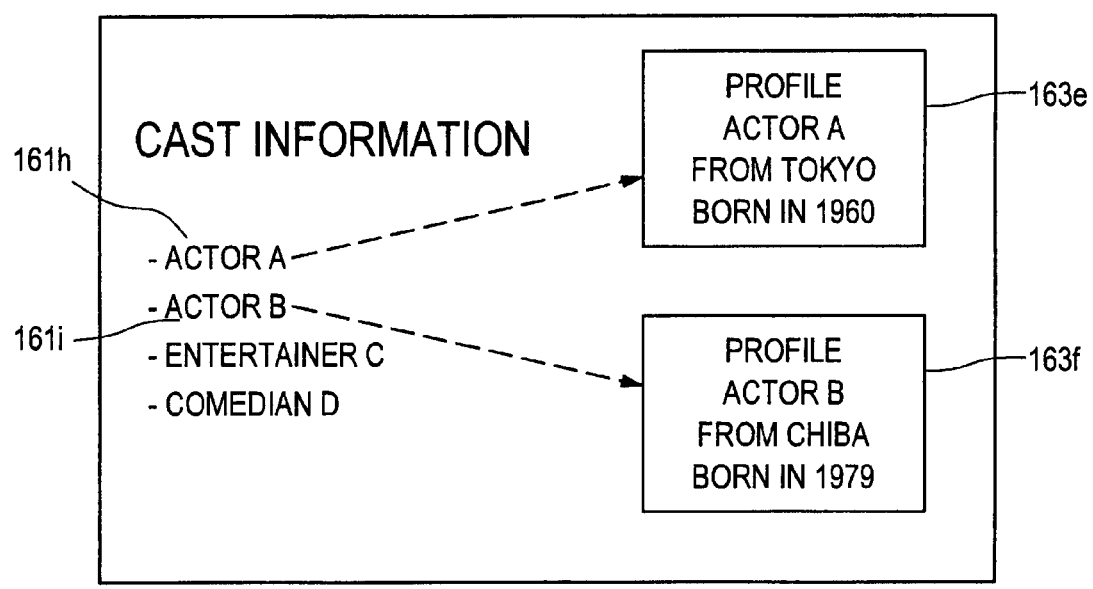
FIG. 16 is a diagram showing an example of displaying information-display windows by dragging links with two fingers simultaneously.

In a portable terminal, it is desirable that a desired operation is completed with less user action, due to a restricted screen size or interface, therefore, the effects of the present embodiment becomes particularly remarkable. Further, in a user interface such as a multi-touch interface, when performing a display as shown in FIG. 16, the following simple operation can be performed: links 161h and 161i are simultaneously dragged with two fingers, and information-display windows 163e and 163f are displayed.

REFERENCE SIGNS LIST

10 Information processing system
100 Information processing device
110 Input section
120 Control section
130 Storage section
131 Display content correspondence information
132 Page analysis result
133 Page information
140 Display content calculation section
150 Communication section
160 Display section
161a Link
161d Link
161b Link
162a Guide information
163b Information window
163e Information-display window
170 Display content acquisition section
200 Analysis device
210 Control section
220 Storage section
221 Page information
222 Page analysis result
230 Analysis section
240 Communication section 300 Web server
310 Control section
320 Storage section
321 Page information
330 Communication section
340 Control section
400 Network

The invention claimed is:

1. An information processing device comprising:
one or more processors being operable to:
accept an input of information;
display information on a display surface;
communicate with another device having first page information, wherein the first page information corresponds to a first page being displayed on the display surface;
store region information and a degree of importance in association with a page analysis result obtained by analyzing second page information, wherein the region information specifies a predetermined region within the first page, wherein the degree of importance increases proportionally with respect to a distance condition corresponding to a position of a link on the first page, wherein the degree of importance corresponds to a number of references of a second page, wherein the second page information is data corresponding to the second page; and
acquire the first page information from the other device and display a first page on the display surface based on the first page information, which, in a case where a link to jump to the second page is included within the first page, when movement information corresponding to link dragging indicates that the link is moved to a predetermined position while being selected is input acquires the page analysis result based on the movement information and the region information and displays on the first page, the page analysis result associated with the region information for specifying the predetermined region of a movement destination of the link.

2. The information processing device according to claim 1, wherein the predetermined region is a region obtained by being divided by one or more lines each extending in a predetermined direction based on a position at which the link is present, and
wherein the one or more processors are operable to store the region information with inclusion of a direction condition indicating a direction based on a position at which the link is present.

3. The information processing device according to claim 2, wherein the one or more processors are operable to store the page analysis result by storing, according to a genre, an analysis result obtained by analyzing the second page information.

4. The information processing device according to claim 1, wherein the predetermined region is a region positioned at a predetermined distance from the link, and
wherein the one or more processors are operable to store the region information with inclusion of a distance condition indicating the predetermined from the link.

5. The information processing device according to claim 4, wherein the one or more processors are operable to store the page analysis result by storing, according to degree of importance, an analysis result obtained by analyzing the second page information.

6. The information processing device according to claim 1, wherein the first page indicates a source web page and the second page indicates a destination web page.

7. The information processing device according to claim 1, wherein the one or more processors are operable to impart a content level to the page analysis result.

8. The information processing device according to claim 7, wherein the one or more processors are operable to associate the content level with a distance condition, the content level being imparted to the page analysis result to which the genre being associated with the direction condition is imparted.

9. The information processing device according to claim 8, wherein the one or more processors are operable to generate display content correspondence information.

10. The information processing device according to claim 1, wherein the one or more processors are operable to extract the genre imparted to the page analysis result and associate the genre with a direction condition.

11. An information processing method comprising:
in an information processing device:
displaying a source web page comprising a link to a destination web page;
analyzing the destination web page to generate a plurality of page analysis results, wherein each page analysis result comprises information relevant to the corresponding destination web page;
storing the page analysis results such that each page analysis results is classified by genre and a degree of importance, wherein each genre is associated with a direction condition comprising a particular direction, wherein the degree of importance is associated with a distance condition comprising a predetermined distance such that the degree of importance increases with the increase in distance;
detecting a first input of hovering over the link;
displaying guide for each genre in the page analysis results such that each genre is displayed in associated direction based on the first input;
detecting a second input of selecting and dragging the link;
determining a link dragging direction and a link dragging distance of the second input; and
displaying the page analysis result associated with the genre corresponding to the detected link dragging direction and with the degree of importance corresponding to the detected link dragging distance.

12. The information processing method according to claim 11, wherein the link dragging direction is determined based on a difference between a first set coordinates at start of the second input and a second set of coordinates at end of the second input.

13. The information processing method according to claim 11, wherein the genre is changed based on the link dragging direction or the link dragging distance of the second input.

14. The information processing method according to claim 11, wherein content level is changed based on the link dragging direction or the link dragging distance of the second input, wherein the content level is classified into one or more stages with respect to the genre, based on the degree of importance and a frequency of being referred to.

15. The information processing method according to claim 11, wherein the displayed page analysis result is modified based on the link dragging distance.

16. The information processing method according to claim 11, wherein more than one links are simultaneously dragged by fingers of a user to display the respective second page information.

17. The information processing method according to claim 11, wherein an increase in the link dragging distance results in a display of a number of genres greater than a pre-determined threshold.

18. An information processing method comprising:
   first page information from the another device and displaying a first page on the display based on the first page information;
   storing region information and a degree of importance in association with a page analysis result obtained by analyzing second page information, wherein the region information specifies a predetermined region within a display surface, wherein the degree of importance increases proportionally with respect to a distance condition corresponding to a position of the link on the first page, wherein the degree of importance corresponds to a number of references of the second page;
   determining whether or not a link is moved to a predetermined region within a display surface based on a movement information and a region information, wherein the link in the first page facilitates jumping from the first page to a second page,a wherein the movement information indicates that the link is moved to a predetermined position while being selected and the region information specifies an association of a predetermined region within the display surface with a page analysis result obtained by analyzing the second page information; and
   displaying on the first page, the page analysis result associated with the region information for specifying the predetermined region of a movement of the link to the predetermined region within a display surface of the information processing device.

19. A non-transitory computer-readable medium having stored thereon, a computer program having at least one code section for information processing, the at least one code section being executable by a computer for causing the computer to perform steps comprising:
   in an information processing device:
   storing region information and a degree of importance in association with a page analysis result obtained by analyzing second page information, wherein the region information specifies a predetermined region within a display surface, wherein the degree of importance increases proportionally with respect to a distance condition corresponding to a position of the link on the first page, wherein the degree of importance corresponds to a number of references of the second page;
   acquiring first page information from another device;
   displaying a first page based on the first page information;
   determining whether or not a link is moved to a predetermined region within a display surface based on a movement information and a region information, wherein the link in the first page facilitates jumping from the first page to a second page, wherein the movement information indicates that the link is moved to a predetermined position while being selected and the region information specifies an associated of a predetermined region while being selected and the region information specifies an associated of a predetermined region within the display surface with a page analysis results obtained by analyzing the second page information;
   displaying on the first page, the page analysis result associated with the region information for specifying the predetermined region of a movement of the link within the display surface.

20. An information processing system comprising:
   an information processing device; and
   an analysis device, wherein the analysis device comprises a first set of one or more processors operable to
   communicate with the information processing device,
   store second page information,
   analyze the stored second page information and acquire a page analysis result, and
   execute processing of transmitting the acquired page analysis result the information processing device, and
   wherein the information processing device comprises a second set of one or more processors operable to
   accept an input of information,
   display information on a display surface,
   communicate with another device havinq first page information, wherein the first page information is displayed on the display surface,
   store region information and a degree of importance in association with a page analysis result obtained by analyzing second page information, wherein the region information specifies a predetermined region within the display surface, wherein the degree of importance increases proportionally with respect to a distance condition corresponding to a position of a link on the first page, wherein the degree of importance corresponds to a number of references of the second page;
   execute processing of receiving the page analysis result from the analysis device,
   store a received page analysis result in association with the region information for specifying the predetermined region within the display surface, and
   execute processing of acquiring the first page information from the other device and also causes the second set of one or more processors are operable to execute processing of displaying the first page on the display surface based on the first page information, which, in a case where a link to jump to the second page is included within the first page, when movement information corresponding to link dragging indicates that the link is moved to a predetermined position while being selected is input via the second set of one or more processors, determines whether or not the link is moved to the predetermined region within the display surface based on the movement information and the region information, and which, when determining that the link is moved to the predetermined region within the display surface, acquires from a storage section and causes the second set of one or more processors are operable to execute processing of displaying on the first page, the page analysis result associated with the region information for specifying the predetermined region of a movement destination of the link.

* * * * *